Dec. 15, 1925.  H. C. EDDY  1,565,992

DEHYDRATION PROCESS

Filed Sept. 8, 1924

INVENTOR:
HAROLD. C. EDDY.
BY
ATTORNEY.

Patented Dec. 15, 1925.

1,565,992

UNITED STATES PATENT OFFICE.

HAROLD C. EDDY, OF LOS ANGELES, CALIFORNIA, ASSIGNOR TO PETROLEUM RECTIFYING COMPANY OF CALIFORNIA, A CORPORATION OF CALIFORNIA.

DEHYDRATION PROCESS.

Application filed September 8, 1924. Serial No. 736,508.

*To all whom it may concern:*

Be it known that I, HAROLD C. EDDY, a citizen of the United States, residing at Los Angeles, in the county of Los Angeles and State of California, have invented a new and useful Dehydration Process, of which the following is a specification.

My invention relates to the art of petroleum dehydration, and is particularly applicable to the dehydration of petroleum emulsions.

It is very common for petroleum to become associated with water either in the well or after it has been taken therefrom. This water is found in the oil either in the form of large masses which will easily settle out if allowed to stand, or in the form of minute particles which will not settle out by gravity if the emulsion is allowed to stand for long periods. The latter type of emulsion, commonly termed a "tight" emulsion, is sometimes rather difficult to separate.

Two general types of apparatus have been developed for the treatment of tight emulsions, the one in most general use consisting of an electrical dehydrator in which the emulsion is subjected to an electrostatic field for the purpose of agglomerating the water into large masses which can be readily settled out. It has also been found that if the emulsion is passed through a filter, the water particles are agglomerated. The electrical dehydrator is, however, defective, in that if it is adjusted to reduce the water content to a small fraction of 1 per cent, the rate of flow therethrough is necessarily very small, and large investment in apparatus is necessary to handle a small quantity of oil. On the other hand, the filtration process has previously proved unsuccessful, due to the fact that the oil generally carries rotary mud, sand, silt or other foreign matter which clogs up the filter, making frequent cleaning necessary. I have found, however, that by a combination of the electrical and the filtration processes, I am able to handle large quantities of oil with comparatively inexpensive and small apparatus, and with a very high degree of separation.

Further objects and advantages of the invention will be made evident hereinafter.

Referring to the drawing which is for illustrative purposes only,

Figure 1:
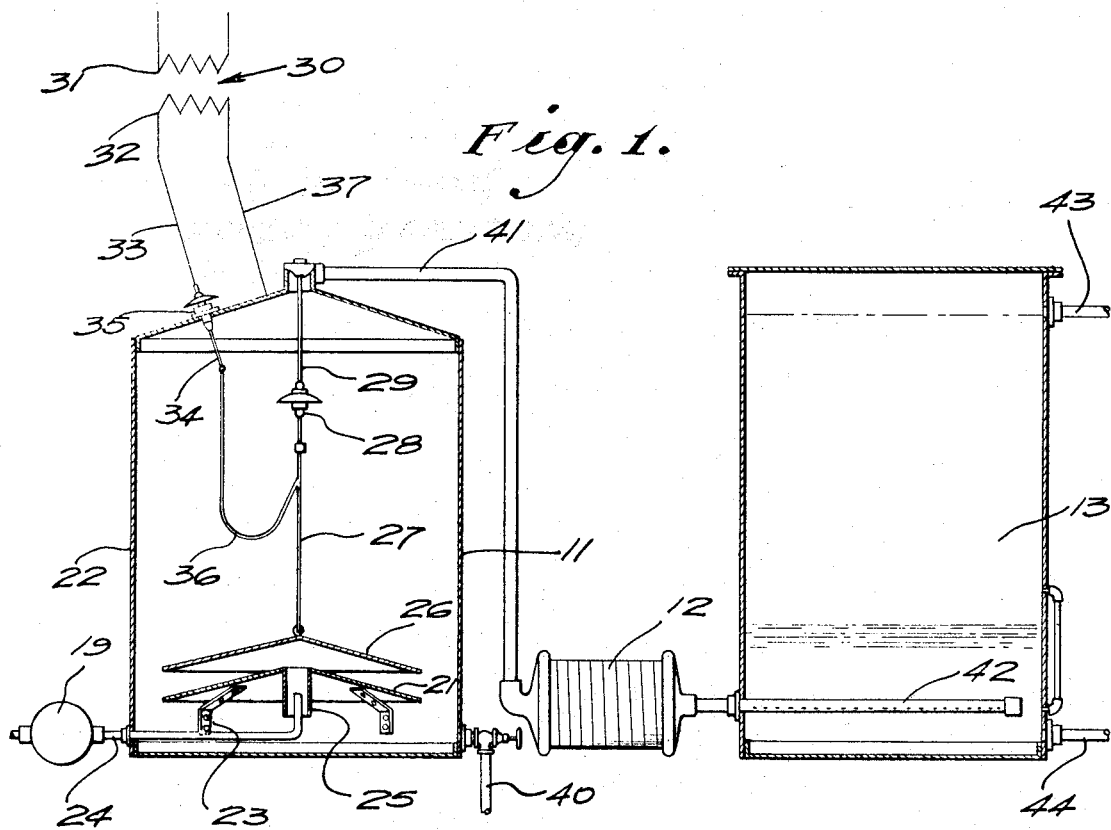
Fig. 1 is a sectional elevation of apparatus suited to carry on my process.
Figure 2:
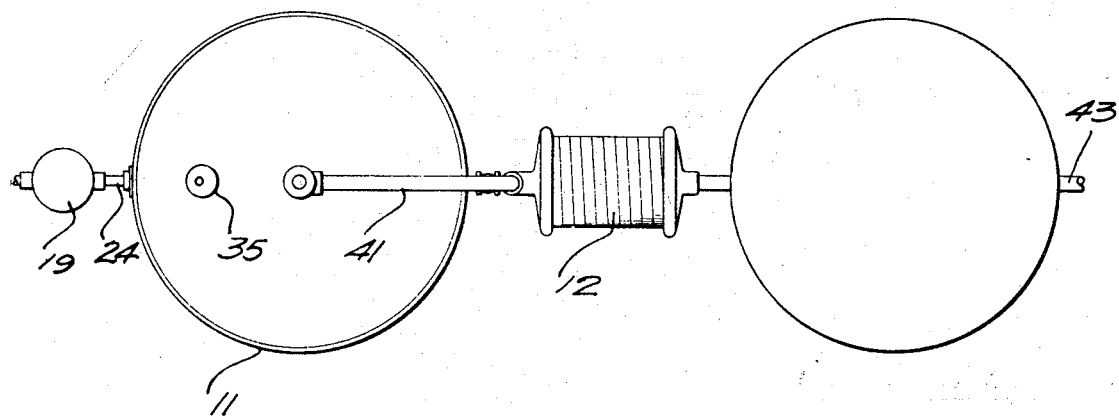
Fig. 2 is a plan view of same.

The apparatus employed consists of a dehydrator 11, a filter 12, and a settling tank 13.

The dehydrator 11 consists of a grounded electrode 21 which is supported inside a tank 22 on suitable brackets 23. Emulsion is delivered through an emulsion inlet pipe 24, from a pump 19, the pipe 24 projecting upwardly inside a pipe 25 which is connected into the center of the electrode 21. The electrode 21 may be of conical shape. Suspended above the grounded electrode 21 is a live electrode 26, this electrode being suspended by means of a rod 27 from a strain insulator 28 which is suspended by a rod 29 from the top of the tank 22.

A transformer 30 is provided having a primary 31 and a secondary 32, this secondary usually delivering current at a potential of 11,000 volts. One terminal 33 of the secondary 32 is connected to a rod 34, passing through an insulator 35, the inner end of the rod 34 being connected by a flexible wire 36 with the rod 27. The other terminal 37 of the secondary 32 is connected directly to the tank 22.

In the dehydrator 11 the emulsion is subjected to the action of an electric field between the electrodes 21 and 26, the greater portion of the water and substantially all of the solid material being agglomerated and settling in the bottom of the tank 22 and being withdrawn through a drain pipe 40. The cleaned oil is taken over through a pipe 41 to the filter 12. This filter may be of any convenient construction, the oil therefrom being delivered through a perforated pipe 42 into the settling tank 13. The pipe 42 is preferably perforated on its under side, and the oil from the filter 12 passes upwardly through a body of hot water contained in the bottom of the tank 13. Cleaned oil is removed from the tank 13 through a pipe 43 and water is removed through a pipe 44.

In the treatment of petroleum emulsions for some purposes, and in many cases in the treatment of other oils, it is necessary to reduce the water content of the emulsion to preferably less than $\frac{2}{10}$ of 1 per cent.

The electrical dehydrator 11 can be set to reduce the emulsion contents of oils below this figure, but if so operated, the capacity of a given size dehydrator might be less than 100 barrels per day. This same type of dehydrator will, however, reduce the content below 3 per cent and will deliver approximately 1500 barrels of cleaned oil from a 25 per cent emulsion.

The filter 12, if operated upon an emulsion of this character, especially where considerable solid matter is carried in the oil, would have a very small capacity and would be impracticable to operate, due to the fact that it would almost immediately clog up and it would be necessary to frequently open and clean it.

I have found, however, that the electrical dehydrator, in reducing the emulsion content to 3 per cent, will remove from the emulsion substantially all of the solid matter carried therein, the water apparently collecting around the solid matter, each particle of which acts as a nucleus for the agglomerated water.

As a result, with the electrical dehydrator operating at approximately 1500 barrels per day, I have found that the emulsion passing over through the pipe 41, although it contains approximately 3 per cent water, is substantially free from suspended solids. Consequently the filter 12 does not become clogged and can be operated over considerable periods without the necessity of cleaning.

In the filter 12 the small water particles are further agglomerated to such a degree that as the emulsion is passed through the perforations in the pipe 42 and upwardly through the water in the settling tank 13, there is a further and very complete separation of the water and the oil. It is not difficult, with suitable apparatus, to reduce the water content to a small fraction of 1 per cent, and to operate over long periods without it being necessary to clean the filter.

It will be seen that by my process I am able to clean large quantities of oil and to reduce the water content to a very small amount. This I accomplish by using the electrical dehydrator and the filter under conditions which insure their maximum efficiency, the electrical dehydrator being especially suited to remove the greater portion of the water and substantially all the suspended solids, and the filter being most efficient in handling emulsion containing only a little water and substantially no solids.

I claim as my invention:

1. A process of dehydrating emulsions containing solid material in suspension which comprises: subjecting the emulsion to the action of an electric field for the purpose of agglomerating and precipitating the water and solids in suspension; removing the material so precipitated; and filtering the residue to agglomerate the water remaining in the residue.

2. A process of dehydrating emulsions containing solid material in suspension which comprises: subjecting the emulsion to the action of an electric field for the purpose of agglomerating and precipitating the water and solids in suspension; filtering the residue to agglomerate water remaining in the residue; and subsequently removing the water agglomerated by said filtration.

3. A process of dehydrating emulsions containing solid material in suspension which comprises: subjecting the emulsion to the action of an electric field for the purpose of agglomerating and precipitating the water and solids in suspension; filtering the residue to agglomerate water remaining in the residue; allowing the residue with the water agglomerated by said filtration to stand for a sufficient period to allow said agglomerated water to settle out; and removing the supernatant oil.

In testimony whereof, I have hereunto set my hand at Los Angeles, California, this 2nd day of September, 1924.

HAROLD C. EDDY.